United States Patent
Blessing et al.

(10) Patent No.: US 12,434,681 B2
(45) Date of Patent: Oct. 7, 2025

(54) ELECTROMECHANICAL BRAKE SYSTEM AND METHOD FOR RELEASING AN ELECTRO-MECHANICAL BRAKE SYSTEM

(71) Applicant: KNORR-BREMSE Systeme fuer Nutzfahrzeuge GmbH, Munich (DE)

(72) Inventors: Michael Blessing, Munich (DE); Andreas Buch, Taufkirchen (DE); Csaba Kokrehel, Budapest (HU); Csaba Mlinarcsek, Budapest (HU); Huba Nemeth, Budapest (HU); Wolfgang Pahle, Bad Wiessee (DE); Janos Szabo, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 449 days.

(21) Appl. No.: 17/921,682

(22) PCT Filed: Mar. 22, 2021

(86) PCT No.: PCT/EP2021/057226
§ 371 (c)(1),
(2) Date: Oct. 27, 2022

(87) PCT Pub. No.: WO2021/219294
PCT Pub. Date: Nov. 4, 2021

(65) Prior Publication Data
US 2023/0166705 A1    Jun. 1, 2023

(30) Foreign Application Priority Data
Apr. 28, 2020  (EP) .................................... 20171696

(51) Int. Cl.
*B60T 13/74*    (2006.01)
*B60T 1/00*    (2006.01)
(Continued)

(52) U.S. Cl.
CPC ............. *B60T 13/741* (2013.01); *B60T 1/005* (2013.01); *B60T 1/062* (2013.01); *F16D 63/006* (2013.01);
(Continued)

(58) Field of Classification Search
CPC ........ B60T 1/005; B60T 1/062; B60T 13/741; B61H 1/00; B61H 5/00; F16D 63/006;
(Continued)

(56) References Cited

U.S. PATENT DOCUMENTS 8,678,147 B2 *  3/2014  Usui ...................... F16D 65/18
                                                        188/72.3
2005/0217952 A1  10/2005  Usui
(Continued)

FOREIGN PATENT DOCUMENTS

DE   10 2004 032 388 A1   1/2006
DE   10 2006 037 242 A1   2/2008
(Continued)

OTHER PUBLICATIONS

International Search Report (PCT/ISA/210) issued in PCT Application No. PCT/EP2021/057226 dated Jun. 29, 2021 with English translation (three (3) pages).
(Continued)

*Primary Examiner* — Robert A. Siconolfi
*Assistant Examiner* — San M Aung
(74) *Attorney, Agent, or Firm* — Crowell & Moring LLP (57) ABSTRACT

An electromechanical brake system has a brake actuator with a power transmission for transmitting an actuating force to a brake pad. The power transmission includes a rotatable shaft, a coupler with a locking element, wherein the coupler can be controlled so that the locking element is engaged with the rotatable shaft and blocks its rotation or so that the locking element is disengaged from the rotatable
(Continued)

shaft so that the rotatable shaft can be rotated. The brake system has a first receptacle into which a first tool can be inserted so that it engages with the rotatable shaft and transmits a rotation on the rotatable shaft.

14 Claims, 9 Drawing Sheets

(51) Int. Cl.
*B60T 1/06* (2006.01)
*F16D 63/00* (2006.01)
*F16D 121/16* (2012.01)
*F16D 121/24* (2012.01)

(52) U.S. Cl.
CPC ...... *F16D 2121/16* (2013.01); *F16D 2121/24* (2013.01)

(58) Field of Classification Search
CPC .... F16D 55/224; F16D 65/18; F16D 2121/14; F16D 2121/16; F16D 2121/24; F16D 2121/26; F16D 2125/36; F16D 2125/40; F16D 2125/50; F16D 2127/04; F16D 2127/06; F16D 2129/08
USPC ........................................................ 188/162
See application file for complete search history.

(56) References Cited

U.S. PATENT DOCUMENTS

| | | | |
|---|---|---|---|
| 2009/0194385 A1* | 8/2009 | Cao .......................... | F16D 65/14 |
| | | | 192/46 |
| 2010/0101900 A1* | 4/2010 | Usui ........................ | F16D 65/18 |
| | | | 188/156 |
| 2010/0236879 A1 | 9/2010 | Kober | |
| 2013/0133989 A1* | 5/2013 | Iida ........................ | F16D 55/224 |
| | | | 188/72.3 |
| 2018/0017115 A1* | 1/2018 | Saoyama ............... | H02K 7/116 |
| 2020/0072308 A1 | 3/2020 | Kocjan et al. | |

FOREIGN PATENT DOCUMENTS

| | | |
|---|---|---|
| EP | 0 176 204 A1 | 4/1986 |
| JP | 2005-315411 A | 11/2005 |
| JP | 2010-64569 A | 3/2010 |
| JP | 2013-87930 A | 5/2013 |
| KR | 10-2007-0031561 A | 3/2007 |
| KR | 10-2007-0060695 A | 6/2007 |
| WO | WO 00/28232 A1 | 5/2000 |
| WO | WO 2008/030204 A1 | 3/2008 |

OTHER PUBLICATIONS

Written Opinion (PCT/ISA/237) issued in PCT Application No. PCT/EP2021/057226 dated Jun. 29, 2021 (seven (7) pages).
Extended European Search Report issued in European Application No. 20171696.6 dated Sep. 15, 2020 (eight (8) pages).
European Notice of Opposition issued in European Application No. 20171696.6 dated Jun. 20, 2024 (56 pages).
"TMK", 2019 TMK Catalog, Dec. 2018, pp. 6-37 plus cover page and copyright page, Deserti Meccanica S.R.L. (34 pages).
"458 model", Miki Pulley Spring Actuated Type Brakes, Aug. 9, 2017, Internet Archive Wayback Machine (1 page).
"Manual Release—MSEB Series", SEPAC Spring Engaged Electromagnetic Brakes, Apr. 21, 2019, Internet Archive Wayback Machine (1 page).
Bullick, J., "Spring Set Brakes—How They Work", KEB America Blog, Dec. 24, 2014, KEB Automation KG (6 pages).
Cover Page of EP 1 044 338 A1 published Oct. 18, 2000 (1 page).
Japanese-language Office Action issued in Japanese Application No. 2022-565815 dated Dec. 12, 2023 with English translation (8 pages).
Chinese-language Office Action issued in Chinese Application No. 202180031787.6 dated Jan. 14, 2025 with English translation (11 pages).

* cited by examiner

ELECTROMECHANICAL BRAKE SYSTEM AND METHOD FOR RELEASING AN ELECTRO-MECHANICAL BRAKE SYSTEM

BACKGROUND AND SUMMARY

The invention refers to an electromechanical brake system, mechanical brake release tools and a corresponding method.

Today, electro-pneumatic brake actuators are frequently used in commercial vehicles. In most cases, these actuators use pneumatic energy sources via pneumatic cylinders in order to realize the actuation of both the service and the parking brake. The parking brake function is realized by an independent actuator to the service brake and can be operated independently. Due to the spring based design of the parking brake actuator, single brake actuation can also be realized without compressed air as the energy source. In the event of a pressure loss in the system, the pre-tensioned spring in the parking brake chamber provides sufficient braking energy to stop the vehicle or keep it stationary. To make the vehicle towable when no compressed air supply is available on board, the parking brake cylinder must be released. In combined pneumatic brake chambers, this release can be achieved by means of a threaded mechanism. A threaded shaft is led out of the brake chamber and is accessible to an operator. The brake can be released by turning this shaft with an ordinary tool.

In the future, electromechanical brake actuation will become more and more common. These brakes must also be able to be released externally. In the event of a failure, if the brakes remain applied and cannot be released in the normal course of operation, a possibility of releasing the brakes is required to make the vehicle towable. Due to the complexity of the electromechanical actuators, a new solution for emergency break release is necessary.

It is the object of the present application to provide an electromechanical brake system, mechanical brake release tools and a corresponding method permitting an emergency release of an electromechanical brake.

According to one aspect, the brake system comprises a brake actuator having a power transmission means for transmitting an actuating force to a brake pad, said power transmission means including a rotatable shaft, a coupling means with a locking element, wherein the coupling means can be controlled so that the locking element is engaged with the rotatable shaft and blocks its rotation or so that the locking element is disengaged from the rotatable shaft so that the rotatable shaft can be rotated, and a first receptacle into which a first tool element can be inserted so that it engages with the rotatable shaft and transmits a rotation on the rotatable shaft to actuate or move the brake pad. The receptacle can be configured such that the first tool element can be freely inserted into it and removed therefrom.

Once the first tool element, which can be a tool such as a wrench, has been inserted into the brake actuator of the brake system so that it engages the rotating shaft, it can be used to manually move the brake actuator and release or clamp the brake. This allows the brake system to be released and activated from the outside even when the vehicle is not in use.

According to an embodiment, the brake system further comprises a second receptacle into which a second tool element can be inserted so that it engages with the locking element and disengages the locking element from the rotatable shaft so that the rotatable shaft can be moved and the brake pad moved or actuated.

According to an embodiment, the second tool element is configured to engage the locking element and to disengage the locking element from the rotating element.

Release of the locking element is a prerequisite before the brake can be released with the first tool element, as the brake actuator and the rotatable shaft cannot be turned when they are locked by the locking element. Release of the locking element can be done manually with the second tool element and allows the locking element to be lifted or shifted and in some cases against the preload of a mechanism that holds the locking element firmly against the rotating shaft in a parking brake or locking condition. In brake systems, the locking element is held against the rotating shaft in a parking brake condition by a spring mechanism or other means such as a permanent magnet. In addition a spring mechanism can be provided that pushes or pulls the locking element into the opposite direction and assists the release of the locking element with the second tool element.

According to an alternative embodiment, the brake system further comprises a second receptacle into which a second tool element can be inserted so that it engages with the locking element and moves the locking element into engagement with the rotatable shaft so that the rotatable shaft is locked and the brake pad cannot be moved or actuated.

According to another embodiment, the rotatable shaft comprises a rotating member in the form of a disk comprising a gearwheel. The rotating member can be provided at one of the ends of the rotatable shaft.

According to an embodiment, the coupling means comprises the spring mechanism for moving the locking element to a position in which it engages one of the sides of the rotating member. The spring mechanism can include one or more springs. In alternative brake systems, the coupling means comprises other means such as a permanent magnet for holding the locking element in a position in which it engages one of the sides of the rotating member. In addition, a spring mechanism can be provided that pushes or pulls the locking element into the opposite direction and assists the release of the locking element with the second tool element.

According to an embodiment, the coupling means comprises a bi-stable clutch which comprises springs, a permanent magnet and a solenoid. The springs hold the locking element in one position such as the position in which the locking element engages the rotating member. The permanent magnet holds the locking element in a second position such as a position in which the locking element is disengaged from the rotating member. The solenoid is able to switch between the two positions in electrical operation. However, according to another embodiment, the first and the second position can be interchanged regarding the engagement or disengagement between the locking element and the rotating member, respectively.

According to yet another embodiment, the first tool element further comprises a threaded shaft, the thread of which has a pitch which can engage the gearwheel of the rotating member of the rotatable shaft. Then the shaft interacts with the first tool element in a manner of a wormgear.

According to an embodiment, the locking element has the shape of a disc and is arranged on the coupling means in way so that it can be moved towards the rotating member and one of its sides is formed to engage one of the sides of the rotating member to block its rotation. The locking element also can be moved so that the one of its sides disengages from said one of the sides of the rotating member to allow its rotation.

The locking element and the rotating member of the rotatable shaft may be arranged as a releasable coupling where locking is achieved by engagement between the two opposing surfaces of the locking element and the rotating member through a mechanism which presses the locking element against the rotating member to achieve a parking brake condition. The mechanism can be a spring mechanism with one or more springs or some other means such as a permanent magnet. The mechanism may also have another arrangement in which one of the locking element or the rotating member is pulled against the respective other part to achieve the parking brake condition. The brake system may comprise means for moving the locking element with respect to the rotating member in regular operation such as an electromagnetic actuator.

According to an embodiment, the tool that is used as the second tool element and allows the locking element to be lifted or shifted can have one or more wedge shaped sections at its one or more end portions that can be inserted between the locking element and the rotating member and effect a separation of the locking element and the rotating member when the second tool element is advanced. The second tool element can have the shape of a fork.

According to an embodiment, the locking element has a disc-shape with tabs or wings extending radially from opposite sides of the disc-shaped body, in which the two wedge-shaped sections of the second tool element can engage to shift the locking element.

According to an embodiment, the locking element, the rotatable shaft and the rotating member are arranged coaxially with respect to their symmetry axes.

According to an embodiment, the power transmission means are electrically driven and cause a rotational movement of the rotatable shaft. An electric motor may be used as an actuator.

According to an embodiment, the coupling means and the locking means are arranged in an electro-magnetic parking brake locking mechanism for locking the brake actuator.

According to another aspect, an emergency braking kit is provided which comprises the brake system as described above and one or both of the first and the second tool elements. The emergency braking kit can be used if the vehicle is out of operation and one or more brakes thereof need to be released or clamped.

According to the invention also a method of releasing an electro-mechanical brake is provided. The method comprises steps of inserting a first tool element into a brake actuator of the electro-mechanical brake so that the first tool element engages a rotatable shaft of the brake actuator, inserting a second tool element into the brake actuator so that the second tool element engages a locking element of the brake actuator, the locking element locking the movement of the brake actuator and the rotatable shaft in a state of a locked brake, disengaging the locking element from the rotatable shaft of the brake actuator by inserting and actuating the second tool element and shifting the locking element, and moving the first tool element to transmit torque to the rotatable shaft of the brake actuator to turn the rotatable shaft to release the brake.

Alternatively or in addition, the method may comprise the steps of inserting a first tool element into a brake actuator of the electro-mechanical brake so that the first tool element engages a rotatable shaft of the brake actuator, moving the first tool element to transmit torque to the rotatable shaft of the brake actuator to turn the rotatable shaft and to lock the brake, inserting a second tool element into the brake actuator so that the second tool element engages a locking element of the brake actuator, by inserting and actuating the second tool element moving the locking element so that it engages the rotatable shaft of the brake actuator so that the locking element locks the movement of the brake actuator and the rotatable shaft in a state of a locked brake.

According to an embodiment, the method comprises the step of turning the first tool element to release torque applied by the rotatable shaft to the locking element in the state of the locked brake before disengaging the locking element from the rotatable shaft.

According to another embodiment, the method comprises the step of selecting one of at least two possible orientations of the second tool element for inserting the second tool element into the brake actuator to engage the locking element and to disengage the locking element from the rotatable shaft of the brake actuator and advancing the second tool element so that wedged end sections of the second tool element according to the selected orientation shift the locking element so that it disengages from the rotatable shaft of the brake actuator.

According to yet another embodiment, the method comprises the step of inserting the second tool element into one of at least two possible receptacles of the brake actuator to engage the locking element and to disengage the locking element from the rotatable shaft of the brake actuator and advancing the second tool element so that according to the selected receptacle the locking element is shifted and disengaged from the rotatable shaft of the brake actuator.

Each of the receptacles can be formed by two openings for receiving two end sections of the second tool element. Inserting the second tool element into the other receptacle may shift the locking element into a position in which the locking element engages the rotatable shaft of the brake actuator.

According to another embodiment, the method comprises the step of selecting one of at least two possible orientations of the second tool element for inserting the second tool element into the brake actuator to engage the locking element and to move the locking element so that it engages the rotatable shaft of the brake actuator and advancing the second tool element so that wedged end sections of the second tool element according to the selected orientation shift the locking element so that it engages the rotatable shaft of the brake actuator.

According to a further embodiment, the method comprises the step of inserting the second tool element into one of at least two possible receptacles of the brake actuator to engage the locking element and to move the locking element so that it engages the rotatable shaft of the brake actuator and advancing the second tool element so that according to the selected receptacle the locking element is shifted and engages the rotatable shaft of the brake actuator.

The method can also include the action of moving the locking element into engagement with the rotatable shaft. This action can be conducted as part of the parking break operation before use of one of the first or second tool element for the disengagement of the locking element from the rotatable shaft described above but also after these actions, for example, when a vehicle has been towed and needs to be parked. The holding of the locking element into engagement with the rotatable shaft can be performed by a magnet, in particular, a permanent magnet of the coupling means or by a spring mechanism holding the locking element into engagement with the rotatable shaft.

The method can include further steps and the features of the brake system and the first and the second tool element can be as described above. The method can be used with an electromechanical brake with electromagnetic parking brake lock, where the electromagnetic lock such as a coupling is released first and then the brake preload is released gently using the first tool element. The external operation of the brake can be carried out as a combination of one or more release steps as described above.

Further characteristics, features and advantages of the invention will result from the following description of embodiments with reference to the drawings.

DETAILED DESCRIPTION OF THE DRAWINGS

Embodiments of the brake operating device according to the invention are described in the following with reference to the figures.

Figure 1:
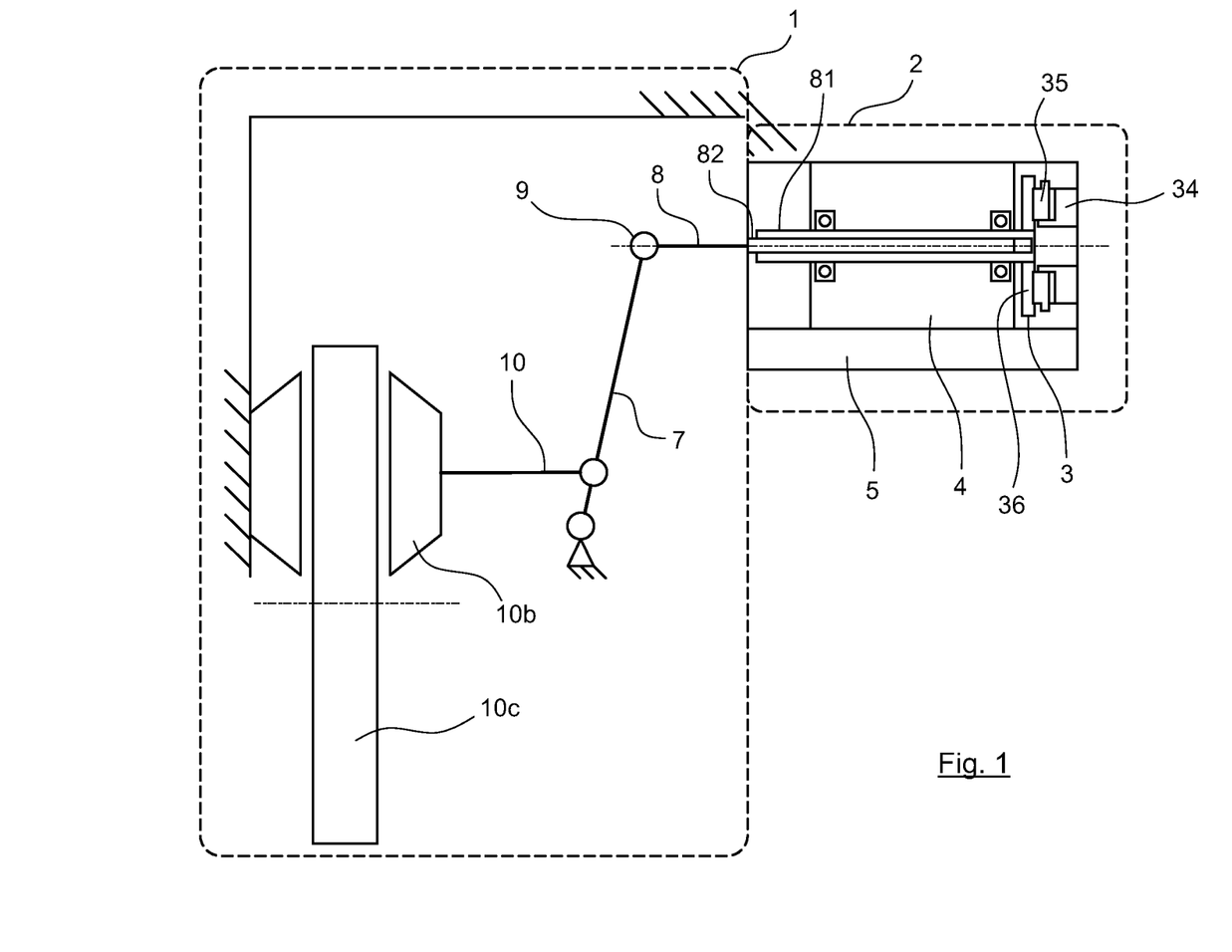
FIG. 1 is a schematic view of an electro mechanical brake system according to one embodiment.

In FIG. 1 an electro-mechanical brake system comprising a brake calliper 1 and a brake actuator 2 which is connected to the brake calliper 1 and comprises a force transmission mechanism including a shaft assembly 8 and a lever assembly connected to the shaft assembly 8 via a push type or push-pull type joint 9 is shown. The lever assembly transmits the actuation force from a motor 4 such as an electric motor to one or more brake pads 10b via a push mechanism 10 which is in connection with a lever 7 of the lever assembly. The brake actuator 2 is constructed so that an actuation force generated by the motor 4 that is connected with a rotatable shaft 81 is transferred by a translational element 82 of the shaft assembly 8 via a rotational-translational converter mechanism as a translational force to the lever 7 which by rotation about a fixed point at the end of the lever 7 transfers the force to the one or more brake pads 10b. The brake actuator 2 also comprises an electro-magnetic coupling or clutch assembly 3.

The coupling assembly 3 has a rotating member 36 which is connected to the rotatable shaft 81 of the shaft assembly 8. The coupling assembly 3 further comprises a coupling body 34 with an electro-magnetic actuator inside and a locking element 35 that can be shifted by the electromagnetic actuator.

In a locked position, the coupling body 34 forces the locking element 35 in contact with the rotating member 36 of the rotatable shaft 81. In the contact position, the rotating member 36 and the locking element 35 and also the rotating member 36 and the coupling body 34 are torque-proof. In this way the coupling 3 can fix the rotatable shaft 81 in a position which provides a constant brake force if the locking element 35 is activated after the clamping force has been applied by the brake actuator 2 to the one or more brake pads 10b.

In an emergency, when the braking system is without power, it may be necessary to deactivate or activate the parking brake. Then, the following mechanical tools and a method can be used to release or lock the brake. In a parking brake state, the brake and the actuator are pre-tensioned so that the brake is locked and the coupling 3 is in lock position.

Figure 2:
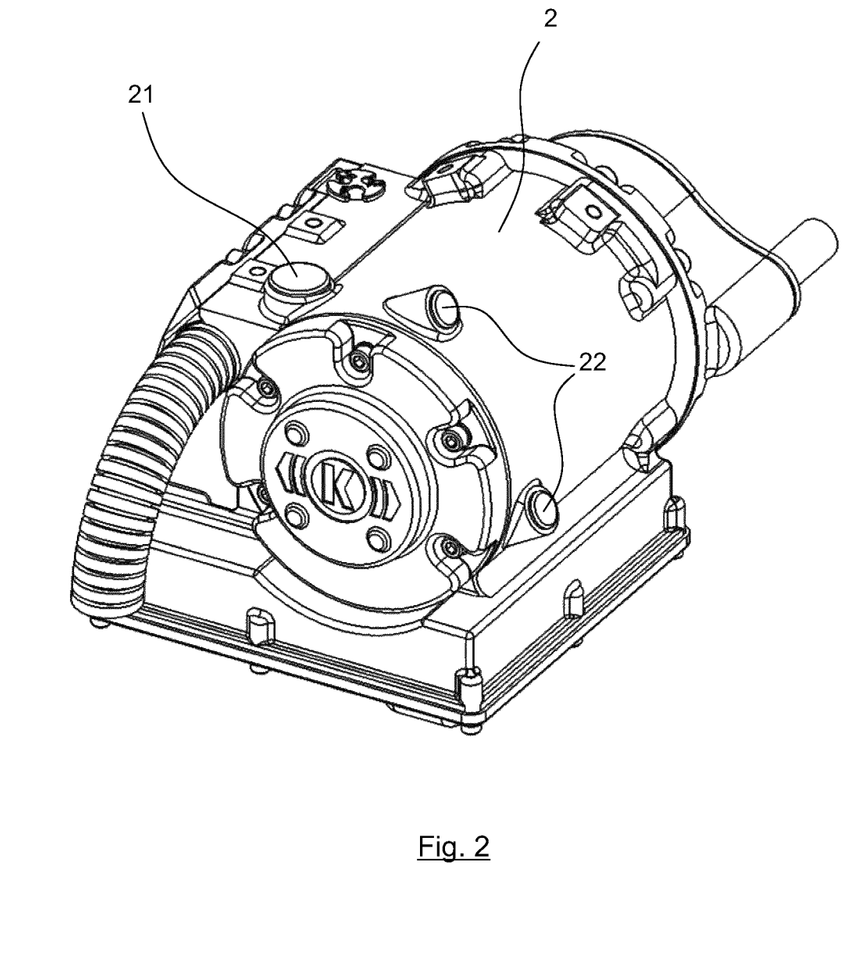
FIG. 2 shows an electro mechanical brake system according to an embodiment.
Figure 3A:
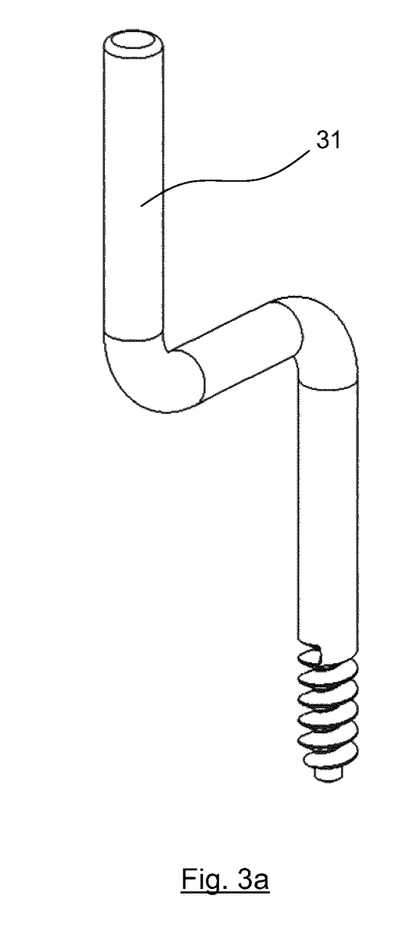
FIG. 3a, b show two embodiments of the first tool element.
Figure 5:
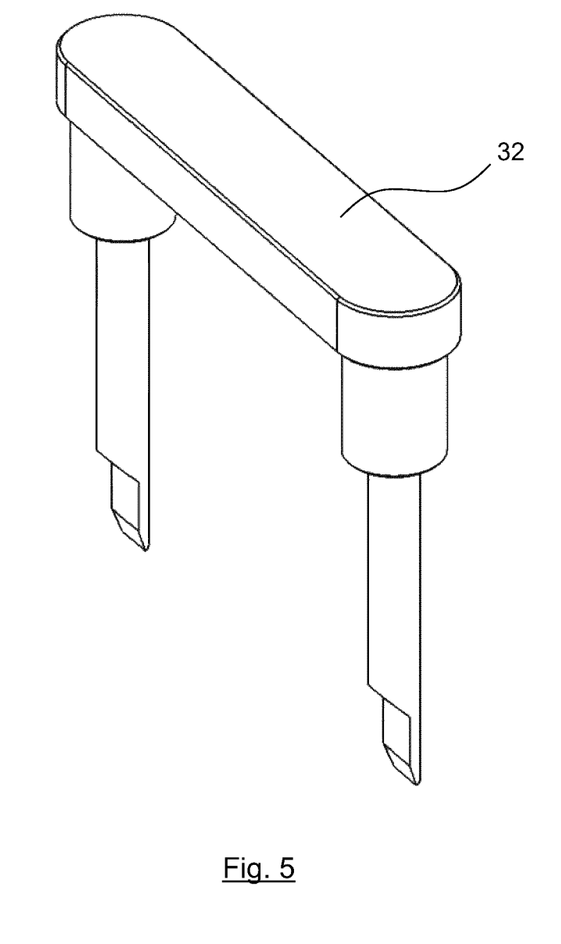
FIG. 5 shows an embodiment of the second tool element.

In the embodiment shown in FIG. 2, the housing has one cover 21 covering one opening for inserting a first tool element 31 in the brake actuator 2 and the coupling assembly 3, and two covers 22 covering two openings for inserting a second tool element 32 to release the brake. Embodiments of the first tool element are shown in FIG. 3a, b. An example of the second tool element 32 which can be implemented as a coupling switch tool having a fork shape is shown in FIG. 5.

Figure 4A:
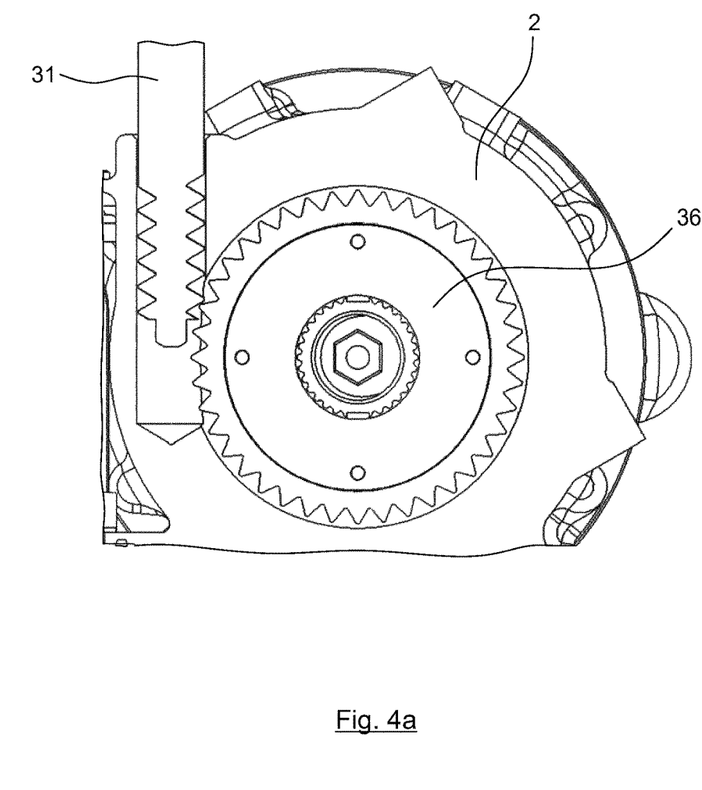
FIG. 4a, b show a cross-sectional view of a brake actuator and a first tool element at insertion (FIG. 4a) and after engagement with a rotating member of a rotatable shaft of the brake actuator (FIG. 4b) according to an embodiment.
Figure 4B:
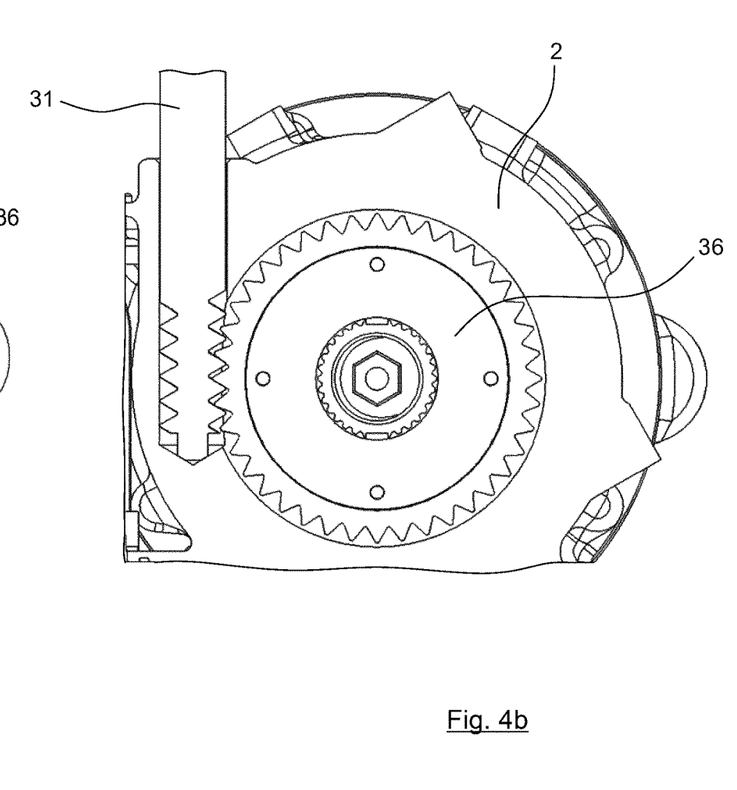

After removing the covers 21, 22, the first tool element 31 can be inserted into the opening in the housing, where the cover 21 was placed, until it reaches a bore shaped receptacle and gets in contact with the rotating member 36 of the coupling assembly 3. The rotating member 36 is formed as a worm wheel. The first tool element 31 which is designed at its distal end as a worm screw engages the rotating member 36 of the coupling assembly 3 and can be screwed into the receptacle until the end of the blind hole of the receptacle in the housing. In this position the first tool element 31 blocks the rotating member 36. In the embodiment shown in FIG. 4b, the rotating member 36 can be blocked against counterclockwise rotation. At this time the coupling assembly 3 is still locked. Since the assembly coupling 3 in the parking brake state is in a pre-stressed condition, a user should give a certain torque to the first tool element 31 to decrease the stress to the coupling 3. This will also help to protect the coupling 3.

Figure 6:
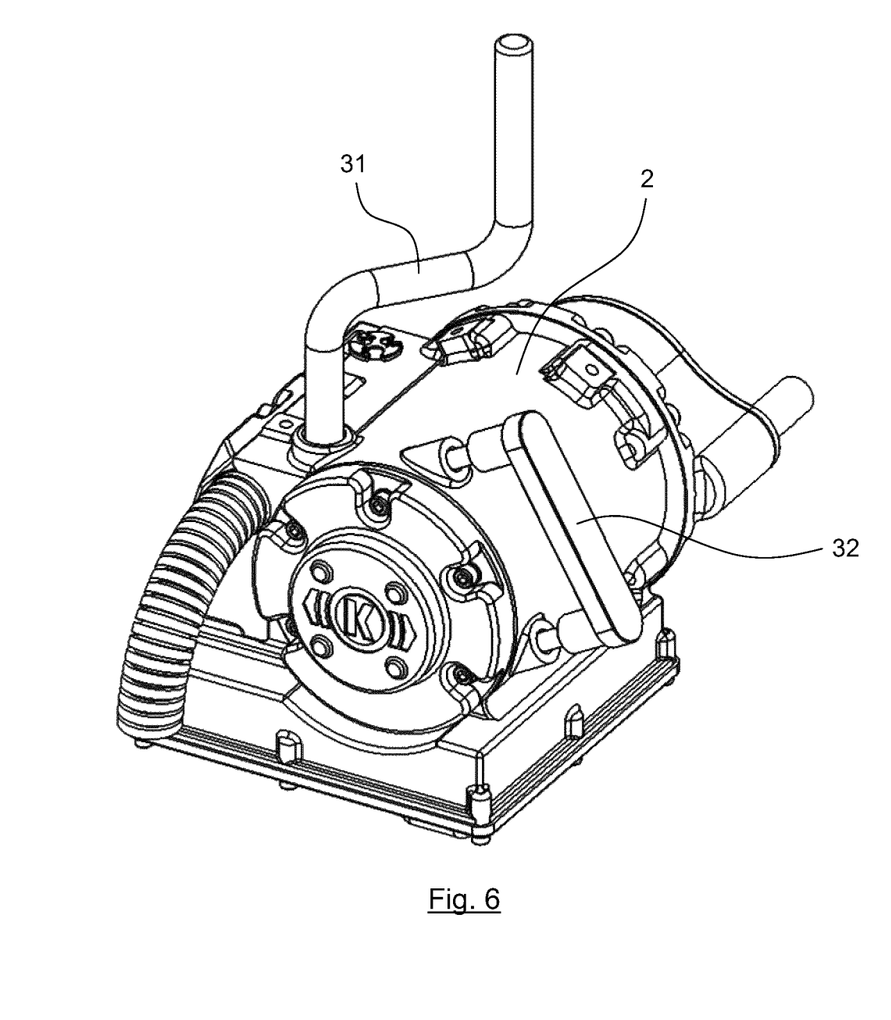
FIG. 6 shows an electro mechanical brake system with the first and second tool elements applied according to an embodiment.

Now, the second tool element 32 can be inserted into the holes in the housing where the covers 22 were placed as shown in FIG. 6. Since the second tool element 32 comprises distal end portions having asymmetric wedge shapes, two orientations at the insertion of the second tool element 32 with different functions are possible, one to deactivate the coupling 3 and the other to activate the coupling 3 depending on the orientation of the wedge shaped sections at the end portions of the second tool element 32 with respect to the locking element 35. Signs, remarks or protrusions on the tool and/or housing can help to choose the right orientation for the desired action.

Figure 7A:
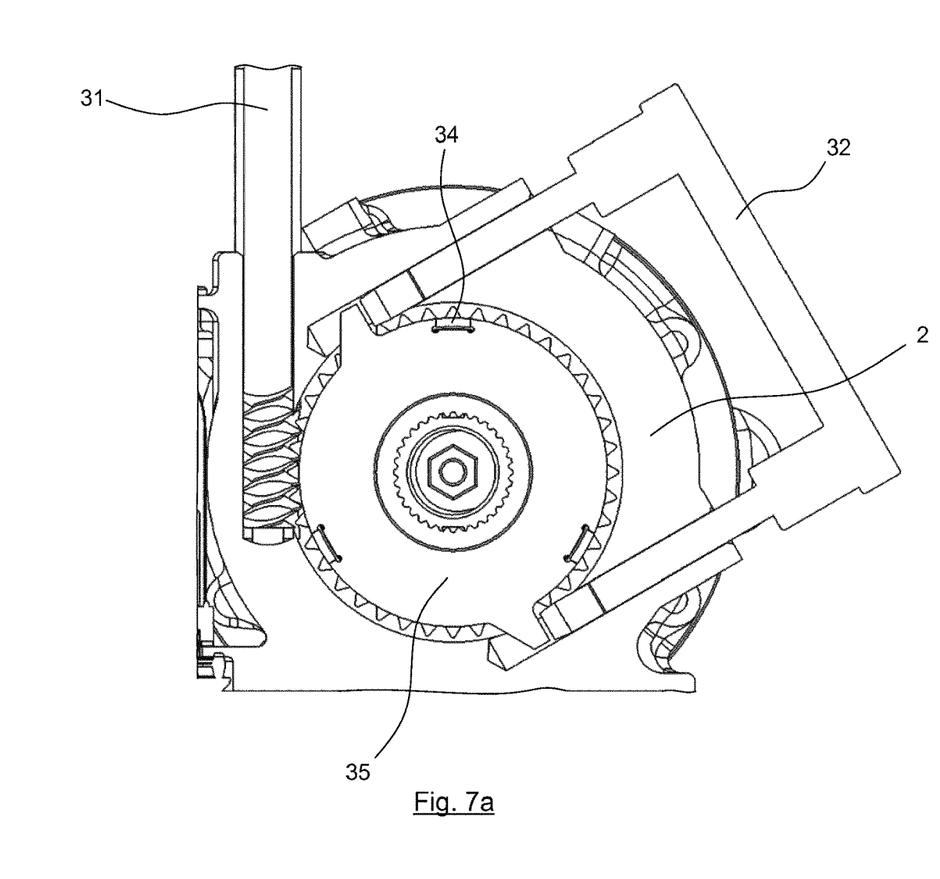
FIG. 7a, 7b show a cross-sectional view of a brake actuator according to an embodiment in a plane perpendicular to the axis of rotation of a rotational shaft of the brake actuator with a first tool element inserted and a second tool element before insertion (FIG. 7a) and in a plane parallel to the axis of rotation of the rotational shaft (FIG. 7b).
Figure 7B:
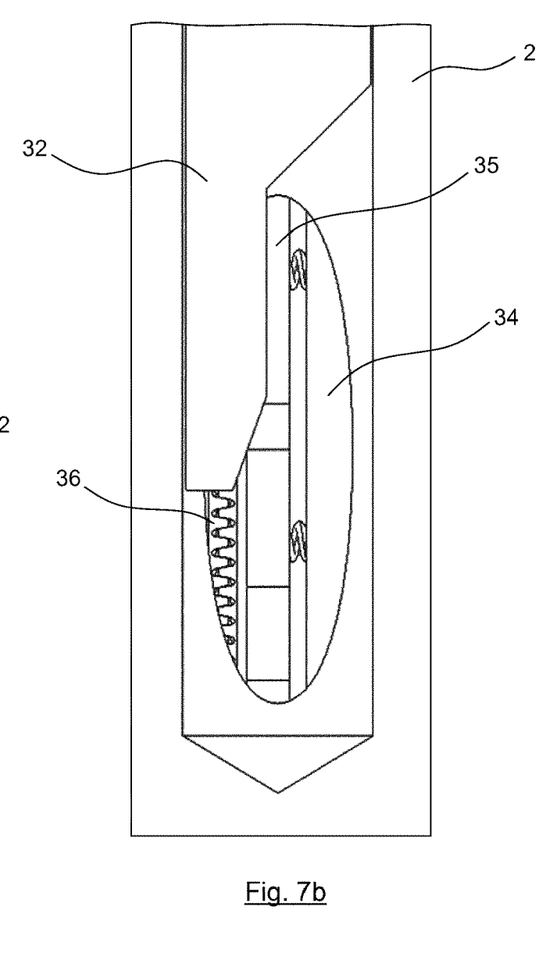
Figures 8A, 8B:
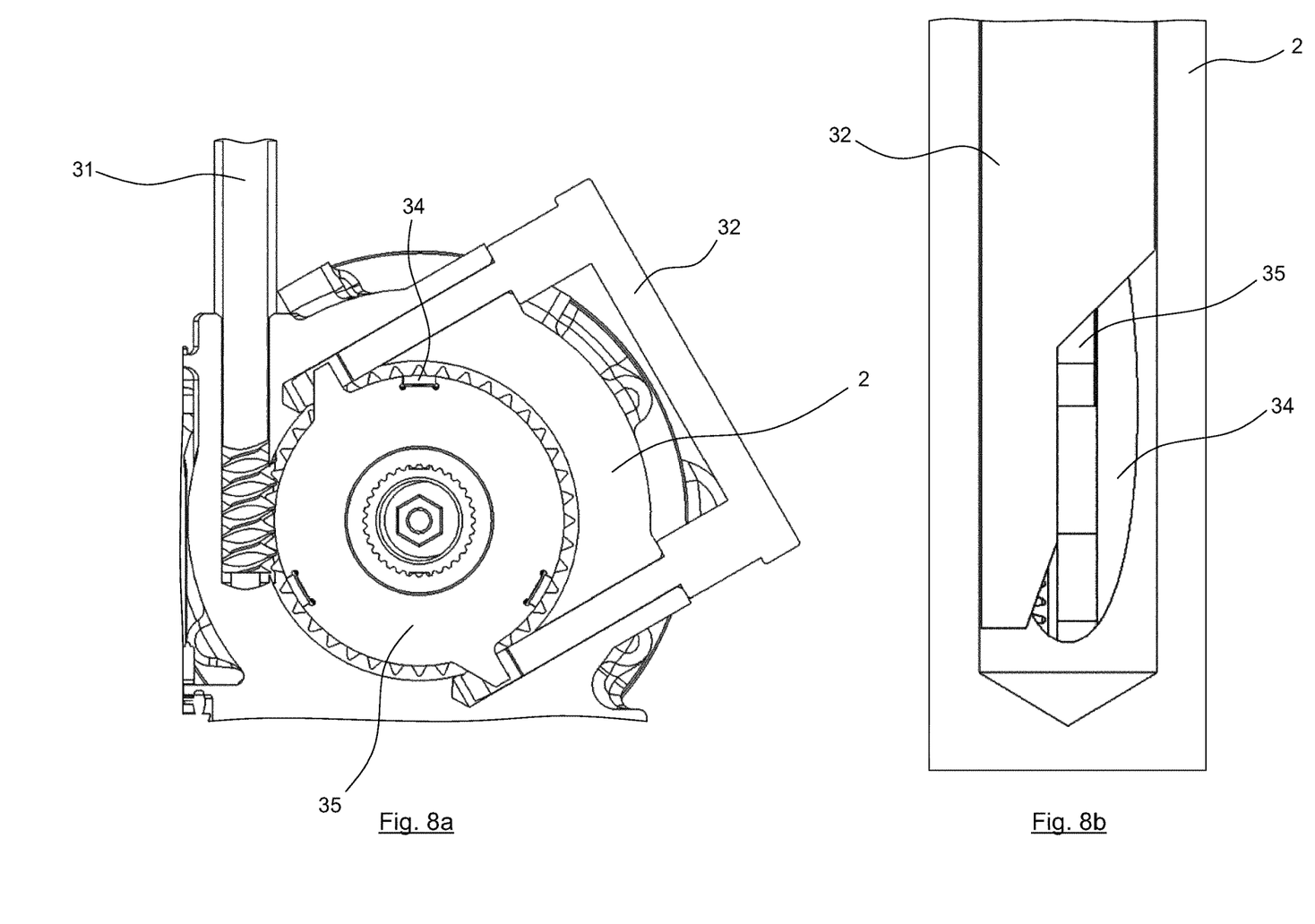
FIG. 8a, 8b show a cross-sectional view of a brake actuator according to an embodiment in a plane perpendicular to the axis of rotation of a rotational shaft of the brake actuator with a first tool element and a second tool element in an insertion and engagement position (FIG. 8a) and in a plane parallel to the axis of rotation of the rotational shaft (FIG. 8b).
Figure 9:
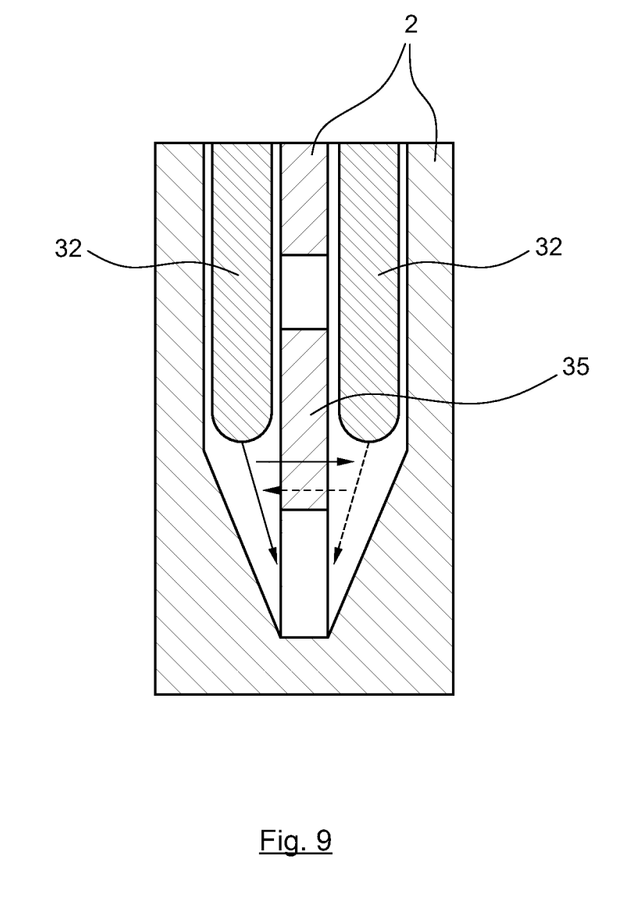
FIG. 9 shows a detail of an engagement of a second tool element with a locking element according to an alternative embodiment.

When inserting the second tool element 32, the wedge shaped sections at the distal ends of the second tool element 32 engage the locking element 35 and shift it against the force of a means such as a spring pre-tensioning the locking element 35 so that the coupling 3 is opened. This opening process is shown in FIGS. 7a, b and FIG. 8a, 8b that illustrate the situation before and after the engagement of the wedge shaped sections at the end portions of the second tool element 32, respectively, with the locking element 35 at opposite sides thereof. In FIGS. 7a and 8a, tabs or wings protruding from opposite sides of the disk shaped locking element 35 are visible that facilitate the engagement of the locking element 35 by the second tool element 32. The tabs help to open the coupling 3 without tilting. Additional contact points between the second tool element 32 and the locking element 35 can be provided to improve the action.

A visible end stop (or a mark) at the second tool element 32 indicates whether the second tool element 32 is inserted deep enough into the housing to unlock the coupling 3. Corresponding protrusions at the two rods of the second tool element 32 are visible in FIGS. 7a and 8a. Now with opened coupling 3, the pre-stress of the brake is led from the rotating member 36 via its worm wheel and the worm screw to the first tool element 31 located in the receptacle of the housing. By turning the first tool element 31, the rotating member 36 will also turn. The worm drive pitch and the diameter of the worm screw front face define how strong the release will be. Once the brake is released, the first tool element 31 and the second tool element 32 can be removed. The holes can be closed with the covers 21, 22.

Figure 3B:
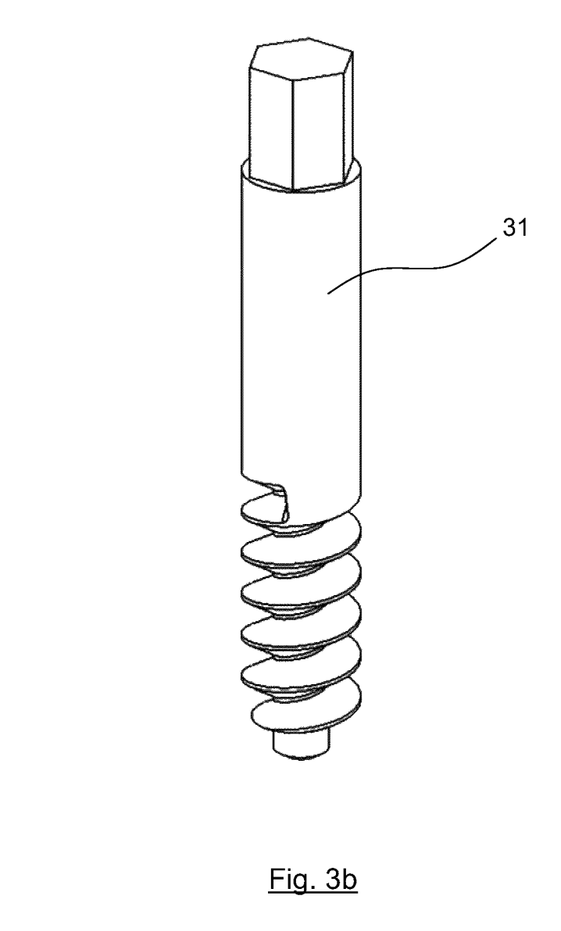

The first tool element 31 can be designed with a crank as shown in FIG. 3a or with a common connection for an electric drive or pneumatic hand tool as shown in FIG. 3b.

With the described first and second tool elements 31, 32, parking brake activation without an operation of the vehicle can also be done. To do this, first the covers 21, 22 are removed. The first tool element 31 must be inserted and turned in forward direction (clockwise in FIG. 4b) to turn the rotating member 36 and to pre-stress the brake. The number of turnings and the turning torque applied by the first tool element 31 defines the clamping force of the brake. Then, the second tool element 32 is inserted into the housing 2 until the end stop, wherein the correct orientation of the second tool element 32 to close the coupling 3 needs to be considered. For parking brake activation, the wedge shaped sections at the end portions of the second tool element 32 shift the locking element 35 in a direction towards the rotating member 36 to lock it in the pre-stressed position of the brake. Then the first tool element 31 and the second tool element 32 can be removed. Subsequently, the brake actuator housing can be closed with the covers 21, 22.

Modifications can be applied to the shown embodiments without leaving the scope of the invention.

According to the embodiments show in the FIGS. 7a, 8a, the wings of locking element 35 are nearly in the same plane as the teeth of the rotating member 36. Due to this arrangement, the first tool element 31 and the second tool element 32 have limited possibilities of orientation around the axis of the actuator without intersecting or blocking each other. Offsetting the wings of the locking element 35 or the rotary part in the axial direction allows better access to the wings for the second tool element 32 around the actuator axis.

Changing the orientation of the second tool element 32 with wedge-shaped distal ends when inserting it into the housing of the brake actuator 2 for locking the locking element 35 or for unlocking the locking element 35 from the rotating part 36 is only an embodiment of an engagement means for moving the locking element 35. Alternatively, wedge sections provided on the locking element 35 for each direction of movement are also conceivable. In this case, parallel bores and receptacles for the second tool element 32 can be provided in the housing of the brake actuator 2, which lead to the respective sloping surface or wedge section of the locking element 35. To open or close coupling 3, the tool must then be inserted into the correct bore to touch the correct sloping surface or wedge section of locking element 35 to achieve locking or unlocking. It is also conceivable that bores or receptacles extend into the brake actuator 2 and its housing from different directions in order to push or pull locking element 35 in the desired direction.

As a further alternative, sloping surfaces can be provided in the brake cylinder housing to bend or deflect the end sections of the second tool element 32 in order to move the locking element 35 during insertion. This is illustrated in FIG. 18, which shows a part of the locking element 35 which is displaced in one of the directions indicated by the horizontal arrows when the end portion of the second tool element 32 is inserted into the brake actuator 2 receptacle on one of the sides.

The end stop of the second tool element 32 can also be fitted at various locations. The advantage of an end stop outside the brake cylinder housing is good visibility. It is also possible to have an end stop at the end of the blind hole of the housing in brake cylinder 2 or an offset in the contour of the second tool element 32 to have the end stop at the wings of locking element 35.

REFERENCE NUMERALS

1 brake calliper
2 brake actuator
3 electromagnetic coupling assembly
4 electric motor
7 lever assembly
8 shaft assembly
9 joint
10b brake pad
10 push mechanism
31 tool
32 tool
34 coupling body
35 coupling moving element
36 rotating member
81 rotatable shaft
82 translational element

The invention claimed is:

1. An electromechanical brake system, comprising:
a brake actuator having a power transmission for transmitting an actuating force to a brake pad, said power transmission including a rotatable shaft;
a coupler with a locking element, wherein the coupler is controllable so that the locking element is engaged with the rotatable shaft and blocks rotation of the rotatable shaft or so that the locking element is disengaged from the rotatable shaft so that the rotatable shaft is rotatable;
a first receptacle into which a first tool is insertable so as to engage with the rotatable shaft and transmit a rotation on the rotatable shaft; and
a second receptacle into which a second tool is insertable so as to engage with the locking element and disengage the locking element from the rotatable shaft.

2. The brake system according to claim 1, wherein
the second tool is configured to be attached to the locking element, and
the locking element is disengageable from a rotating element.

3. The brake system according to claim 1, wherein
the rotatable shaft comprises a rotating member in the form of a disk comprising a gearwheel.

4. The brake system according to claim 3, wherein the coupler comprises a spring for moving the locking element to a position in which the locking element engages one side of the rotating member.

5. The brake system according to claim 4, wherein the first tool comprises a threaded shaft, a thread of which has a pitch which engages the gearwheel.

6. The brake system according to claim 3, wherein the locking element has a disc shape and is arranged on the coupler so as to be movable so that one of its sides is engageable with one of the sides of the rotating member to block rotation of the rotating member and is disengageable from said one of the sides of the rotating member to allow rotation of the rotation member.

7. The brake system according to claim 1, wherein the locking element has a disc-shape, with tabs extending radially from the disc-shape on opposite sides.

8. The brake system according to claim 1, wherein the power transmission is electrically driven and causes a rotational movement of the rotatable shaft.

9. The brake system according to claim 1, wherein the coupler is arranged in an electro-magnetic parking brake locking mechanism for locking the brake actuator.

10. An emergency braking kit, comprising:
the brake system of claim 1; and
one or both of the first tool and the second tool.

11. A method of releasing an electro-mechanical brake, comprising:
inserting a first tool into a brake actuator of the electro-mechanical brake so that the first tool engages a rotatable shaft of the brake actuator;
inserting a second tool into the brake actuator so that the second tool engages with a locking element of the brake actuator, the locking element locking movement of the brake actuator;
disengaging the locking element from the rotatable shaft of the brake actuator by inserting the second tool; and
moving the first tool to transmit power to a rotating element of the brake actuator to turn the rotatable shaft to release the brake.

12. The method of claim 11, further comprising:
turning the first tool to release torque applied by the rotatable shaft to the locking element in the state of the locked brake before disengaging the locking element from the rotatable shaft.

13. The method of claim 11, further comprising:
selecting one of at least two possible orientations of the second tool for inserting the second tool into the brake actuator to engage the locking element and to disengage the locking element from the rotatable shaft of the brake actuator; and
advancing the second tool so that wedged end sections of the second tool according to the selected orientation shift the locking element so that the locking element disengages from the rotatable shaft of the brake actuator.

14. The method of claim 11, further comprising:
inserting the second tool into one of at least two possible receptacles of the brake actuator to engage the locking element and to disengage the locking element from the rotatable shaft of the brake actuator; and
advancing the second tool element so that, according to the selected receptacle, the locking element is shifted and disengaged from the rotatable shaft of the brake actuator.

* * * * *